(12) United States Patent
Chivite Zabalza et al.

(10) Patent No.: US 12,418,170 B2
(45) Date of Patent: Sep. 16, 2025

(54) ELECTRICAL POWER SYSTEM CONVERTER CONTROL

(71) Applicant: ROLLS-ROYCE plc, London (GB)

(72) Inventors: Francisco Javier Chivite Zabalza, Stafford (GB); David R Trainer, Derby (GB); Mark Sweet, Chesterfield (GB); Matthew C Morris, Glasgow (GB); Zafer Jarrah, Bristol (GB); James A Campbell, Nottingham (GB)

(73) Assignee: ROLLS-ROYCE plc, London (GB)

( * ) Notice: Subject to any disclaimer, the term of this patent is extended or adjusted under 35 U.S.C. 154(b) by 380 days.

(21) Appl. No.: 17/950,445

(22) Filed: Sep. 22, 2022

(65) Prior Publication Data

US 2023/0123533 A1 Apr. 20, 2023

(30) Foreign Application Priority Data

Oct. 20, 2021 (GB) ...................... 2115015

(51) Int. Cl.
*H02H 7/125* (2006.01)
*B64D 27/10* (2006.01)
(Continued)

(52) U.S. Cl.
CPC .......... *H02H 7/1257* (2013.01); *B64D 27/10* (2013.01); *B64D 27/34* (2024.01); *B64D 27/359* (2024.01);
(Continued)

(58) Field of Classification Search
None
See application file for complete search history.

(56) References Cited

U.S. PATENT DOCUMENTS

2007/0047274 A1* 3/2007 Hwang ............... H02M 1/10
363/52
2013/0208514 A1 8/2013 Trainer et al.
(Continued)

FOREIGN PATENT DOCUMENTS

DE 19548612 A1 6/1997
EP 0867998 A1 9/1998
(Continued)

OTHER PUBLICATIONS

Wikipedia "Clipper (electronics)" (Year: 2020).*
(Continued)

*Primary Examiner* — Gerald L Sung
(74) *Attorney, Agent, or Firm* — Oliff PLC

(57) ABSTRACT

A electrical power system comprises: an electrical machine operable to output AC; a DC electrical network; a power electronics converter connected between the AC output of the electrical machine and the DC electrical network and including a plurality of transistors and associated diodes connected in parallel with the transistors; and a controller configured to control switching of the transistors of the converter so that, during normal operation of the electrical power system, the converter rectifies the AC output of the electrical machine to supply the DC electrical network with DC electrical power. The controller is further configured, responsive to a determination to the effect there is a fault in the DC electrical network, to control a voltage source, to inject a voltage to bias the diodes of the converter, and to control the switching of the transistors to control a level of current supplied to the faulted DC electrical network.

19 Claims, 10 Drawing Sheets

(51) Int. Cl.
  *B64D 27/34* (2024.01)
  *B64D 27/359* (2024.01)
  *B64D 31/16* (2024.01)
  *F02C 6/00* (2006.01)
  *H02J 3/00* (2006.01)
  *H02J 3/01* (2006.01)
  *H02J 3/02* (2006.01)
  *H02M 1/00* (2006.01)
  *H02M 1/32* (2007.01)
  *H02M 5/458* (2006.01)
  *H02M 7/219* (2006.01)
  *B64D 27/02* (2006.01)

(52) U.S. Cl.
  CPC ................ *B64D 31/16* (2024.01); *F02C 6/00* (2013.01); *H02J 3/001* (2020.01); *H02J 3/01* (2013.01); *H02J 3/02* (2013.01); *H02M 1/0058* (2021.05); *H02M 1/32* (2013.01); *H02M 5/4585* (2013.01); *H02M 7/219* (2013.01); *B64D 27/026* (2024.01); *B64D 2221/00* (2013.01); *F05D 2270/053* (2013.01)

(56) References Cited

U.S. PATENT DOCUMENTS

| | | | |
|---|---|---|---|
| 2015/0155794 A1* | 6/2015 | Long | H02H 7/16 |
| | | | 363/53 |
| 2017/0033708 A1 | 2/2017 | Elserougi et al. | |
| 2018/0316275 A1* | 11/2018 | Yoshida | H02M 7/125 |
| 2020/0119634 A1 | 4/2020 | Perkio et al. | |
| 2021/0175815 A1 | 6/2021 | Bruce | |

FOREIGN PATENT DOCUMENTS

| | | |
|---|---|---|
| EP | 2858231 A1 | 4/2015 |
| EP | 2999105 A1 | 3/2016 |
| EP | 3780367 A1 | 2/2021 |
| GB | 2519791 A | 5/2015 |
| WO | 2015062970 A1 | 5/2015 |

OTHER PUBLICATIONS

Green Power Co. "Rectifier Output Smoothing" (Year: 2017).*
Wikipedia "Auxiliary power unit" (Year: 2020).*
Apr. 22, 2022 Combined Search and Examination Report issued in Great Britain Patent Application No. GB2115016.4.
U.S. Appl. No. 17/950,423, filed Sep. 22, 202 under inventor name Francisco Javier Chivite Zabalza et al.
Feb. 28, 2023 Search Report issued in European Patent Application No. 22196867.0.
Feb. 24, 2023 Search Report issued in European Patent Application No. 22196868.8.
Yu, Jin-Yeol, "A New Thyristor DC Solid-State Circuit Breaker Capable of Performing Operating Duty," 2019 22nd International Conference on Electrical Machines and Systems (ICEMS), Aug. 11, 2019, pp. 1-4.
Jul. 18, 2024 Office Action issued in European Patent Application No. 22196867.0.
Apr. 20, 2022 Search Report issued in Great Britain Patent Application No. GB2115015.6.
Mar. 5, 2025 Notice of Allowance issued in U.S. Appl. No. 17/950,423.

* cited by examiner

ELECTRICAL POWER SYSTEM CONVERTER CONTROL

CROSS-REFERENCE TO RELATED APPLICATIONS

This specification is based upon and claims the benefit of priority from United Kingdom Patent Application No. 2115015.6, filed on 20 Oct. 2021, the entire contents of which are incorporated herein by reference.

TECHNICAL FIELD

This disclosure relates to electrical power systems, more particularly to the control of power electronics converters in electrical power systems. The electrical power systems may be of particular utility in transport applications including but not limited to aerospace.

BACKGROUND

In aerospace, aircraft and their power and propulsion systems are becoming increasingly electric in their design. So-called 'more electric engines' (MEEs) and 'more electric aircraft' (MEAs) derive all or substantially all of their propulsive thrust from turbomachinery but make greater use of electrical power compared with conventional platforms. They may, for example, use electrical power to power auxiliary systems which have previously been powered mechanically or pneumatically, or may use spool-coupled electrical machines to transfer power to, from and between engine spools to provide improvements in engine operability and efficiency. In hybrid electric aircraft the propulsive thrust is derived from engines (e.g., gas turbine engines) and from other sources, typically batteries and/or fuel cells which supply electrical power to engine- or propulsor-coupled electrical machines.

Some proposed more electric and hybrid electric platforms include DC electrical networks which receive electrical power from engine-driven electrical machines via AC to DC converters (i.e., rectifiers). The upper circuit of FIG. 4 illustrates a typical arrangement in which a three-phase electrical generator, which may be coupled with and driven by a spool of a gas turbine engine, is connected with a DC network via a two-level AC-DC converter. Each phase leg of the converter has two transistors (e.g., IGBTs), each of which is connected in anti-parallel with an associated diode. To rectify the AC output of the generator, for each phase leg current is commutated between the upper diode and the lower transistor, with each conducting for half of each AC cycle.

The lower circuit of FIG. 4 illustrates the effect of a fault in the DC network which places a low impedance across the network terminals. In this case both the DC and AC sides of the converter assume a low voltage condition, which in the limit may be zero Volts. In this condition there is no voltage to reverse bias the diodes, which means the AC-DC converter loses control and in effect reverts to being an uncontrolled diode rectifier. The level of current which will be supplied to the DC network in the faulted condition will therefore depend mainly on the voltage generated by and the impedance of the electrical machine.

In some applications it is acceptable for the converter to operate as an uncontrolled diode rectifier when there is a DC network fault. In other applications, however, including aerospace applications, this mode of operation may be highly undesirable because the electrical machines may generate high voltages and/or may have low impedances, such that the high levels of fault current will be supplied to the fault site in the DC network.

It would be desirable to be able to control the level of fault current supplied to the DC electrical network in the presence of a DC network fault.

SUMMARY

The invention is directed to an electrical power system, a method of controlling an electrical power system and a controller for an electrical power system as set out in the appended claims.

According to a first aspect, there is provided an electrical power system comprising: an electrical machine operable to output AC; a DC electrical network; a power electronics converter connected between the AC output of the electrical machine and the DC electrical network and comprising a plurality of transistors and associated diodes connected in parallel with the transistors; and a controller configured to control switching of the transistors of the converter so that, during normal operation of the electrical power system, the converter rectifies the AC output of the electrical machine to supply the DC electrical network with DC electrical power. The controller is further configured, responsive to a determination to the effect there is a fault in the DC electrical network, to control a voltage source to inject a voltage to bias the diodes of the converter, and to control the switching of the transistors to control a level of current supplied to the faulted DC electrical network.

By responding to a DC network fault with the injection of a diode-biasing voltage the system retains the ability to commutate current between the diodes and transistors despite the collapse of the DC network voltage. This allows the converter to be switched into states in which the fault current can be reduced to zero, or at least to an average level below the full fault current level that would otherwise be conducted to the DC network. Not only does this protect loads in the DC network from a potentially very high fault current, it can provide an opportunity to perform protective measures, e.g., the opening of circuit breaking components (e.g., mechanical or semiconductor contactors or circuit breakers) in the DC network, whilst the network is subject to zero or low current. This may reduce problems associated with e.g., contactor arcing which can occur when components are actuated in high current conditions. Furthermore, the ability to control the DC side fault current may be particularly advantageous when a variable voltage and/or variable frequency generator (e.g., a permanent magnet generator) is employed as the fault current produced by the converter operating as an uncontrolled diode rectifier may vary significantly with generator shaft speed.

The voltage source may comprise one or more of the following connectable with the power electronics converter and DC electrical network: a resistor; a capacitor; an inductor; and/or a semiconductor switching component. Said component(s) may be connected in series with (e.g., between) the DC output of the converter and the DC electrical network. Said component(s) may be connected in parallel with a controllable switch, whereby the component(s) may be selectively connected upon determination of a fault.

Where the voltage source comprises a semiconductor switching component, controlling the voltage source to inject the voltage to bias the diodes may comprise operating the semiconductor switching component in a linear operating region to produce the biasing voltage. For example, a transistor may be operated for short periods of time in its linear region so as to develop a higher than normal voltage to produce the diode commutating voltage.

Where the voltage source comprises a capacitor, controlling the voltage source to inject the voltage to bias the diodes may comprise controlling the charge or discharge of the capacitor to produce the biasing voltage. For example, the voltage source may comprise a circuit (e.g., a bridge circuit such as a half-bridge or full-bridge) incorporating semiconductor switching components (e.g., transistors) and a capacitor. The controller may control the switching of the semiconductor switching components of the circuit so as to charge or discharge the capacitor to bias the diodes in response to the determination there is a fault in the DC network.

The electrical power system may further comprise a soft-start circuit, and the soft-start circuit may comprise the voltage source. For example, the soft-start circuit may comprise a resistor and switch (e.g., a semiconductor switching device such as a transistor) connected in parallel. In response to the determination of the fault, the switch may be opened to connect the resistor to the converter and DC electrical network. In another example where the switch is a transistor, the transistor may be operated for short periods of time in its linear region so as to develop a higher-than-normal voltage to produce the diode commuting voltage. The use of a soft-start circuit to provide the voltage source function may be particularly convenient because the electrical power system may already include a soft-start circuit. Thus, no additional components or equipment need be provided.

Controlling the switching of the transistors to control the level of current supplied from the electrical machine to the faulted DC electrical network may comprise: switching the transistors of the converter to a crow-bar configuration in which current from the electrical machine does not flow to the DC network. Zero fault current is supplied to the DC network in the crow-bar configuration and the current is instead contained within the converter (e.g., within one half of the bridge of a bridge-configured converter).

Controlling the switching of the transistors to control the level of current supplied from the electrical machine to the faulted DC electrical network may comprise: repeatedly switching the transistors between the crow-bar configuration and a rectifier configuration in which current from the electrical machine does flow to the DC network. In this case the time spent in the crow-bar configuration reduces the time-averaged current supplied to the DC network.

Controlling the switching of the transistors to control the level of current supplied from the electrical machine to the faulted DC electrical network may comprise: modulating a pulse width modulation (PWM) control parameter to control the level of current supplied from the electrical machine to the faulted DC electrical network. For example, a frequency and/or pulse width (i.e., duty cycle) of a PWM signal used to control the switching of the transistors may be adjusted to control (e.g., reduce) the level of current supplied to the DC network.

The electrical power system may further comprise a filter for smoothing a waveform of the current supplied to the faulted DC electrical network. The filter may be a low-pass filter.

The diodes of the converter may be separate from the transistors, with the transistors being of any suitable known type (e.g., IGBTs, MOSFETs). In other examples the diodes may be body diodes of MOSFETs. Those skilled in the art will understand the term "body diode" to be the diode character inherent to a MOSFET, which can effectively be considered to be a diode connected in parallel with the bi-directional switchable conduction path between the source and drain of the MOSFET.

The electrical machine may be of any suitable type. The electrical machine may for example be a permanent magnet machine, a wound field machine, or a switched reluctance machine.

The electrical machine may have a plurality of phases; and the power electronics converter may comprises a phase leg for each one of the plurality of phases of the electrical machine. Each phase leg may comprise: a first transistor and associated parallel diode connected between a phase connection of the electrical machine and a first DC output of the converter; and a second transistor and associated parallel diode connected between the phase connection of the electrical machine and a second DC output of the converter. The first and second DC outputs of the converter may be connected with the DC electrical network. Any number of phases greater than or equal to two may be used. In one specific example the number of phases is three, and in another specific example the number of phases is four.

According to a second aspect, there is provided a method of controlling an electrical power system comprising an electrical machine, a DC electrical network and a power electronics converter connected between the electrical machine and the DC electrical network. The method comprises: generating AC using the electrical machine and supplying the AC to an input of the converter; controlling switching of transistors of the converter to rectify the AC input to a DC output and supply the DC output to the DC electrical network; determining a condition to the effect that there is a fault in the DC electrical network; responsive to the determination, controlling a voltage source to inject a voltage to bias diodes of the converter; and after controlling the voltage source to inject a voltage to bias diodes of the converter, controlling switching of the transistors of the converter to control a level of current supplied to the DC electrical network.

Controlling switching of the transistors of the converter to control the level of current supplied to the DC electrical network may comprise: switching the transistors of the converter to a crow-bar configuration in which current from the electrical machine does not flow to the DC network.

Controlling switching of the transistors of the converter to control the level of current supplied to the DC electrical network may comprise: repeatedly switching the transistors between the crow-bar configuration and a rectifier configuration in which current from the electrical machine does flow to the DC network.

Controlling switching of the transistors of the converter to control the level of current supplied to the DC electrical network may comprise: modulating a pulse width modulation control parameter to control the level of current supplied from the electrical machine to the faulted DC electrical network.

The method may further comprise, after controlling switching of the transistors of the converter to control the level of current supplied to the DC electrical network: opening one more circuit breakers or contactors in the DC electrical network to isolate the fault in the DC network. In this way the fault and/or other DC network components can be isolated. By opening the contactor after controlling the level of current, problems such as contactor arcing can be reduced. Such problems may be particularly reduced if the opening is performed at zero current, e.g., when the converter is in the crow-bar configuration.

According to a third aspect, there is provided a controller for an electrical power system configured to: during normal operation of the electrical power system, control switching of a plurality of transistors of a power electronics converter to rectify AC received by the converter from an electrical machine; and responsive to a determination to the effect there is a fault in a DC electrical network connected to a DC side of the converter, control a voltage source to inject a voltage to bias diodes of the converter, and control the switching of the transistors to control a level of current supplied to the faulted DC electrical network.

The controller may be implemented as a single controller or multiple separate (e.g., distributed) controllers. Thus the controller may be or may form part of a control system. The controller may be implemented in software, hardware or a combination of the two. The controller may be or may be a functional module of an Engine Electronic Controller (EEC) or a Full Authority Digital Engine Controller (FADEC).

According to a fourth aspect, there is provided an aircraft power and propulsion system comprising: a gas turbine engine; and an electrical power system according to the first aspect. The electrical machine of the electrical power system is mechanically coupled with a spool of the gas turbine engine. The power electronics converter may be a unidirectional AC to DC converter (i.e., a rectifier) or a bidirectional AC-DC converter capable of operating as either a rectifier or an inverter depending on an operating mode of the electrical machine.

According to a fifth aspect, there is provided an aircraft comprising the power and propulsion system of the fourth aspect. The aircraft may be a solely gas-turbine-powered aircraft (e.g., a more electric aircraft) or a hybrid electric aircraft.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

FIG. 1

Figure 1:
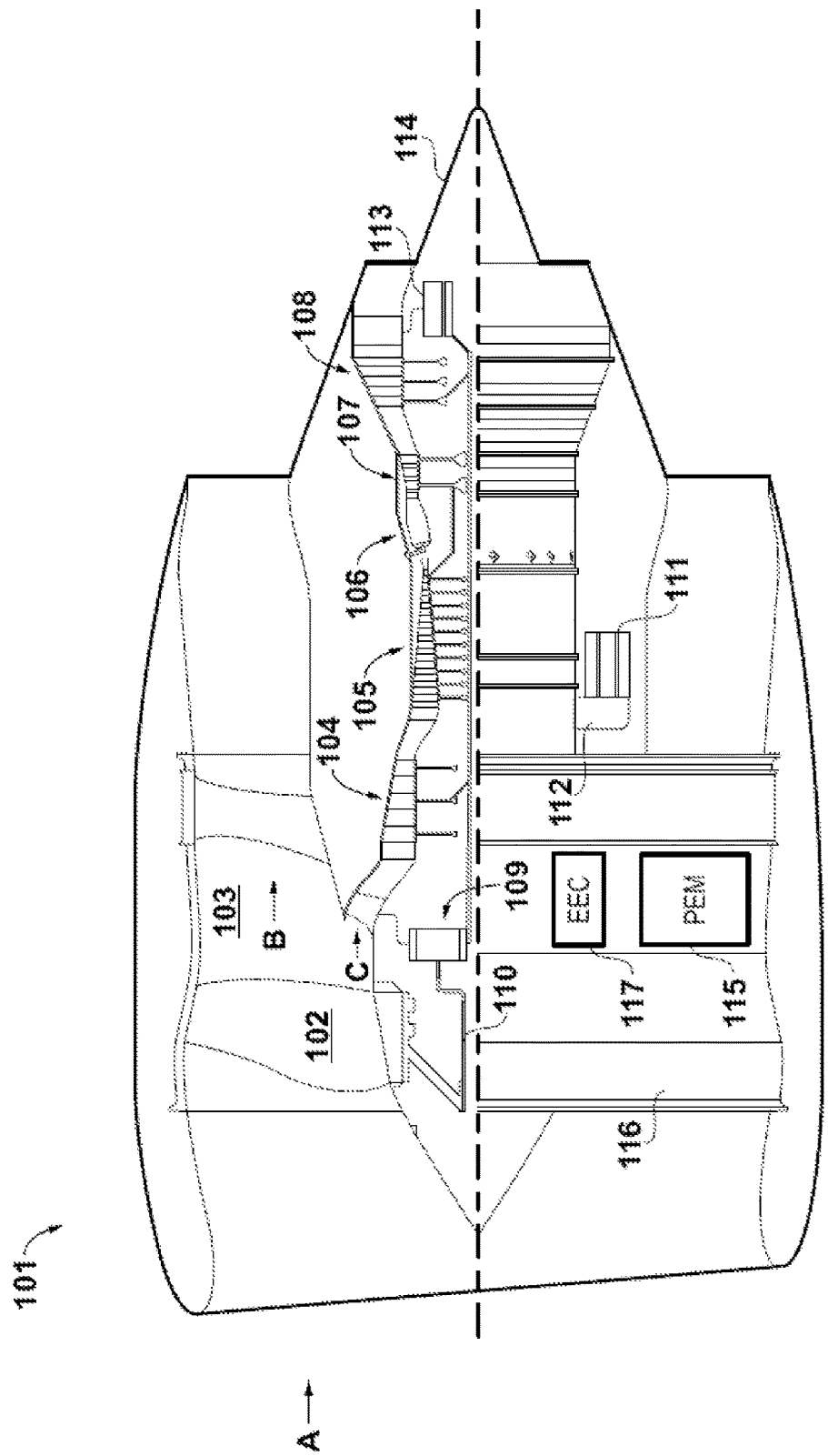
FIG. 1 shows a general arrangement of a turbofan engine for an aircraft.

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of FIG. 1 comprises one or more rotary electrical machines, generally capable of operating both as a motor and as a generator. The number and arrangement of the rotary electrical machines will depend to some extent on the desired functionality. Some embodiments of the engine 101 include a single rotary electrical machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electrical machine 111 coupled with the high-pressure spool and a second rotary electrical machine 113 coupled with the low pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electrical machine 111 is driven by the high-pressure spool by a core-mounted accessory drive 112 of conventional configuration. In alternative embodiments, the first electrical machine 111 may be mounted coaxially with the turbomachinery in the engine 101. For example, the first electrical machine 111 may be mounted axially in line with the duct between the low- and high-pressure compressors 104 and 105. In FIG. 1, the second electrical machine 113 is mounted in the tail cone 114 of the engine 101 coaxially with the turbomachinery and is coupled to the low-pressure turbine 108. In alternative embodiments, the second rotary electrical machine 113 may be located axially in line with low-pressure compressor 104, which may adopt a bladed disc or bladed drum configuration to provide space for the second rotary electrical machine 113. It will of course be appreciated by those skilled in the art that any other suitable location for the first and (if present) second electrical machines may be adopted.

The first and second electrical machines 111, 113 are connected with power electronics. Extraction of power from or application of power to the electrical machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electrical machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e., both of the core gas turbine and the first and second electrical machines 111 and 113. In this way, the EEC 117 may holistically respond to both thrust demand and electrical power demand.

The one or more rotary electrical machines 111, 113 and the power electronics 115 may be configured to output to or receive electric power from one, two or more dc busses. The dc busses allow for the distribution of electrical power to other engine electrical loads and to electrical loads on the airframe.

Those skilled in the art will appreciate that the gas turbine engine 101 described above may be regarded as a 'more electric' gas turbine engine because of the increased role of the electrical machines 111, 113 compared with those of conventional gas turbines.

Figure 2A:
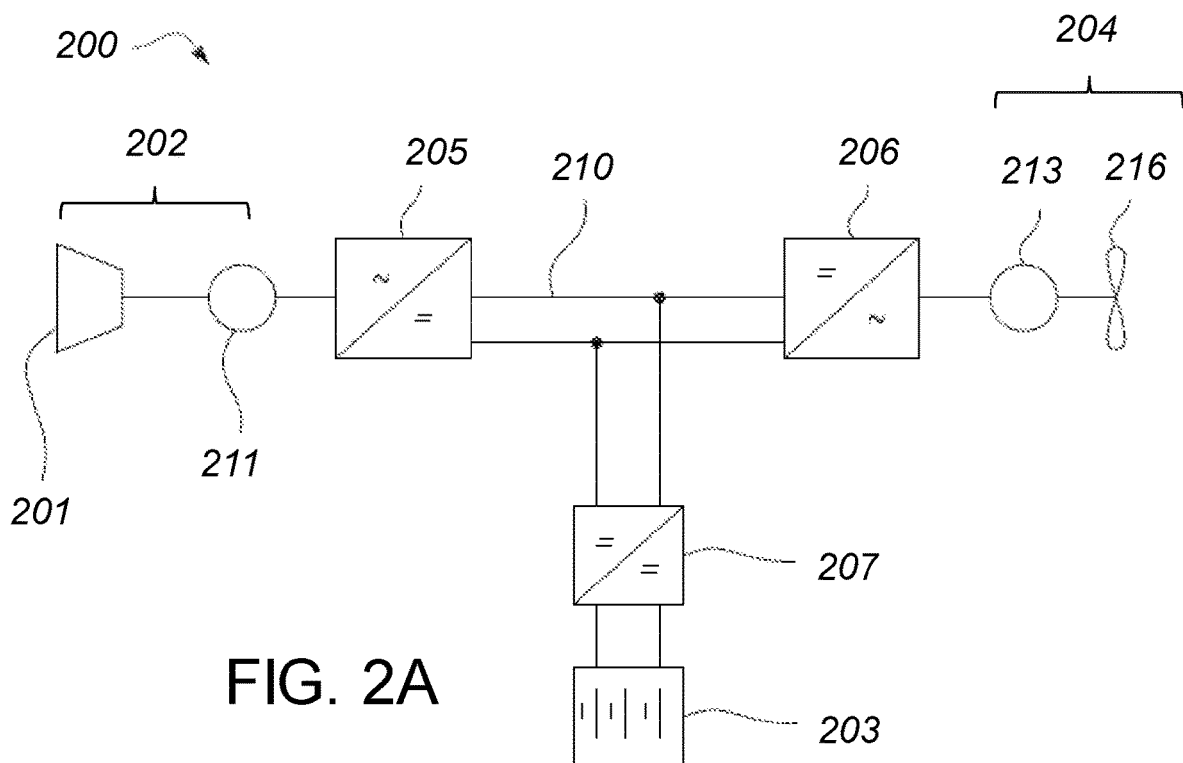
FIG. 2A is a schematic illustration of a hybrid electric aircraft propulsion system.
Figure 2B:
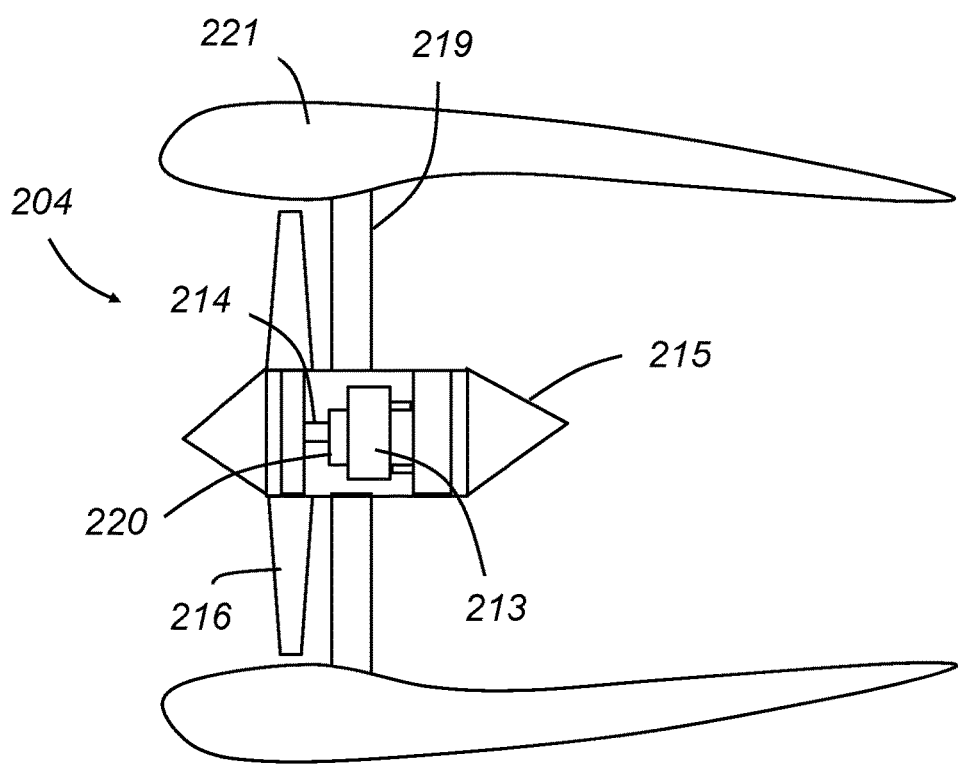
FIG. 2B illustrates an electrically powered propulsor such as may be used in a hybrid electric propulsion system.

FIGS. 2A and 2B

FIG. 2A illustrates an exemplary propulsion system 200 of a hybrid electric aircraft. The propulsion system 200 includes a generator set 202 comprising an engine 201 and electrical generator 211, and a battery pack 203. Both the generator set 202 and the battery pack 203 are used as energy sources to power a motor-driven propulsor 204, an example of which is shown in FIG. 2B.

The illustrated propulsion system 200 further comprises an AC/DC converter 205, a dc distribution bus 210, a DC/AC converter 206 and a DC/DC converter 207. It will be appreciated that whilst one generator set 202 and one propulsor 204 are illustrated in this example, a propulsion system 200 may include more than one generator set 202 and/or one or more propulsor 204.

A shaft or spool of the engine 201 is coupled to and drives the rotation of a shaft of the generator 211 which thereby produces alternating current. The AC/DC converter 205, which faces the generator 211, converts the alternating current into direct current which is fed to various electrical systems and loads via the dc distribution bus 210. These electrical systems include non-propulsive loads (not shown in FIG. 2A) and the motor 213 which drives the propulsor 204 via the DC/AC converter 206.

The battery pack 203, which may be made up of a number of battery modules connected in series and/or parallel, is connected to the dc distribution bus 210 via the DC/DC converter 207. The DC/DC converter 207 converts between a voltage of the battery pack 203 and a voltage of the dc distribution bus 210. In this way, the battery pack 203 can replace or supplement the power provided by the generator set 202 (by discharging and thereby feeding the DC distribution bus 210) or can be charged using the power provided by the generator set 202 (by being fed by the dc distribution bus 210).

Referring to FIG. 2B, in this example the propulsor 204 takes the form of a ducted fan. The fan 216 is enclosed within a fan duct 219 defined within a nacelle 221, and is mounted to a core nacelle 215. The fan 216 is driven by the electrical machine 213 via a drive shaft 214, both of which may also be thought of as components of the propulsor 204. In this embodiment a gearbox 220 is provided between the electrical machine 213 and the drive shaft 214.

The electrical machine 213 is supplied with electric power from a power source, for example the generator set 202 and/or the battery 203 via the dc bus 210. The electrical machine 213 of the propulsor, and indeed the electrical machine 211 of the generator set 202, may be of any suitable type, for example of the permanent magnet synchronous type.

Those skilled in the art will recognise the propulsion system 200 of FIGS. 2A-B to be of the series hybrid type. Other hybrid electric propulsion systems are of the parallel type, while still others are of the turboelectric type or have features of more than one type. The configuration of the more electric engine 101 of FIG. 1 may be considered similar to a parallel hybrid system, with the main distinction being the roles of the electrical machines. For example, the electrical machines of a more electric engine are generally only used in motor mode to start the engine and to improve engine operability, whereas the electric machines of a parallel hybrid propulsion system are used to motor the spools to meaningfully add to the amount of propulsive thrust produced by the turbomachinery.

Those skilled in the art will also appreciate that the hybrid architecture illustrated in FIG. 2A is only one example, and other architectures are known and will occur to those skilled in the art.

FIGS. 3A-B

Figure 3A:
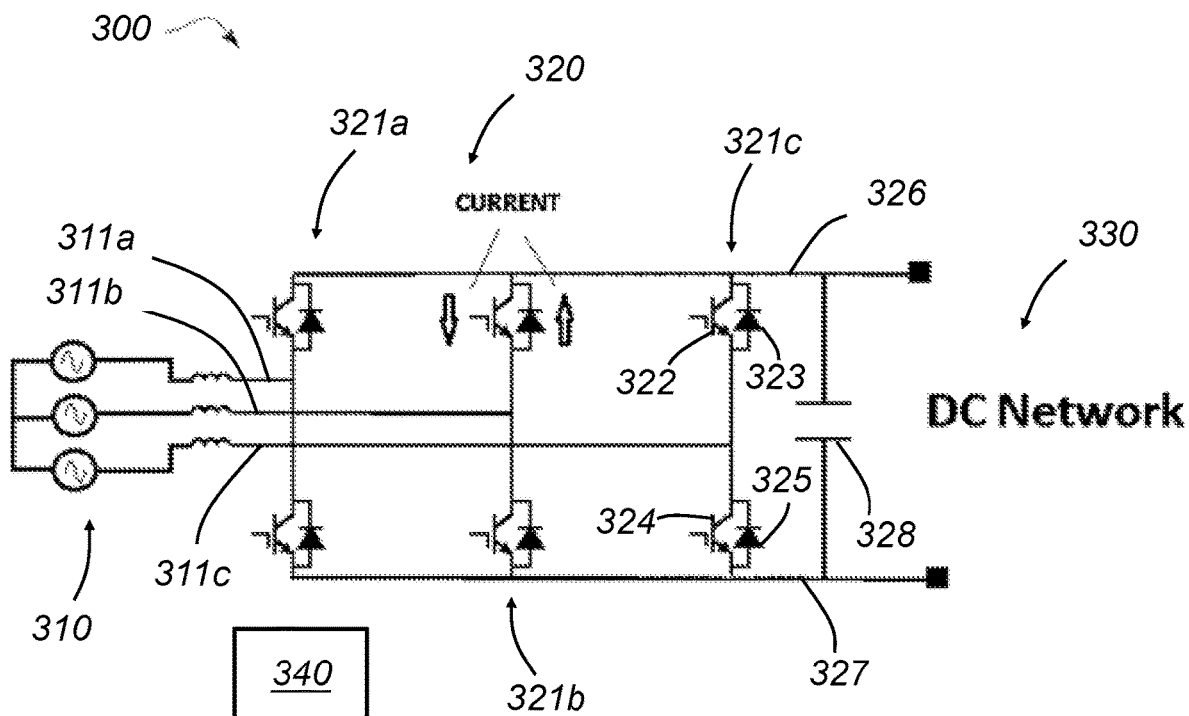
FIG. 3A illustrates a portion of an exemplary electrical power system in which an AC-DC converter connects a 3-phase electrical generator with a DC network.

FIG. 3A illustrates a portion of an electrical power system 300 such as may be used in the aircraft and engine systems described above with reference to FIG. 1 and FIGS. 2A-B. The electrical power system 300 includes an electrical machine 310 operable as a generator to generate AC, an AC-DC power electronics converter 320 operable to rectify the AC received from the electrical machine 310 and output DC, a DC electrical network 330 which receives the DC power output by the converter 320, and a controller 340 which exercises control over the electrical power system 300 including the converter 320.

In this example the electrical machine 310 is a three-phase machine which outputs its three phases through three phase connections 311a, 311b, 311c. It will however be understood that other numbers of phases (e.g., four) and other connection arrangements could be used. The electrical machine 310 can be of any type and configuration suitable for the application requirements. In one specific embodiment it is a permanent magnet synchronous machine (PMSM) of radial flux configuration, but other types of machine including wound field and switched reluctance, and other configurations such as axial flux and transverse flux, are also contemplated. The electrical machine 310 may be specifically configured as a generator, or it may be operable in both motor and generator modes (e.g., where the electrical machine 310 is a 'starter-generator' of a gas turbine engine).

The illustrated power electronics converter 320 is a two-level, three-phase full-bridge rectifier with insulated gate bipolar transistors (IGBTs). It includes three phase legs 321a, 321b, 321c, each of which is connected to a corresponding one of the phase connections 311a, 311b, 311c from which it receives AC. Each phase leg 321a, 321b, 321c includes two branches: a first (upper) branch which includes a transistor 322 and associated diode 323 connected in anti-parallel with the transistor 322 and a second (lower) branch which includes a transistor 324 and associated diode 325 connected in anti-parallel with the transistor 324. The upper branch of each phase leg 321a, 321b, 321c is connected with a first DC output 326. The lower branch of each phase leg 321a, 321b, 321c is connected with a second DC output 327. The first and second DC outputs 326, 327 connect with the DC electrical network 330, whereby the DC electrical network 330 is supplied with DC electrical power. A DC link capacitor 328 is also shown, the function of which will be familiar to those skilled in the art of power electronics.

Whilst a two-level, three-phase rectifier 320 with IGBTs is illustrated, this is not intended to limit the invention. Different numbers of phases and different converter topologies may be used. The converter 320 may also utilise another type of transistor, for example MOSFETs (e.g., wide band gap semiconductor MOSFETs such as Silicon Carbide (SiC) MOSFETs), especially if the converter is bidirectional to allow for both rectification and inversion of current. Where MOSFETs are used, the anti-parallel diodes 323, 325 may be retained or alternatively omitted in place of the MOSFET's inherent body diode, as will be understood by those skilled in the art. However generally speaking it is preferable to retain the anti-parallel diode, even if MOSFETs are used, as the additional diode may permit e.g., faster switching, higher current rating and lower on-state voltage drop.

During normal operation of the converter 320 as a rectifier, the controller 340 uses pulse width modulation to control the switching of the transistors to commutate current between the upper and lower branches of the phase legs to affect suitable rectification of the AC to DC. In this example, when current flows through the upper branch of a phase leg to the first output 326 it flows through the diode 322, whereas when current flows through the lower branch of the phase leg to the second output 327 it flows through the transistor 324.

Figure 3B:
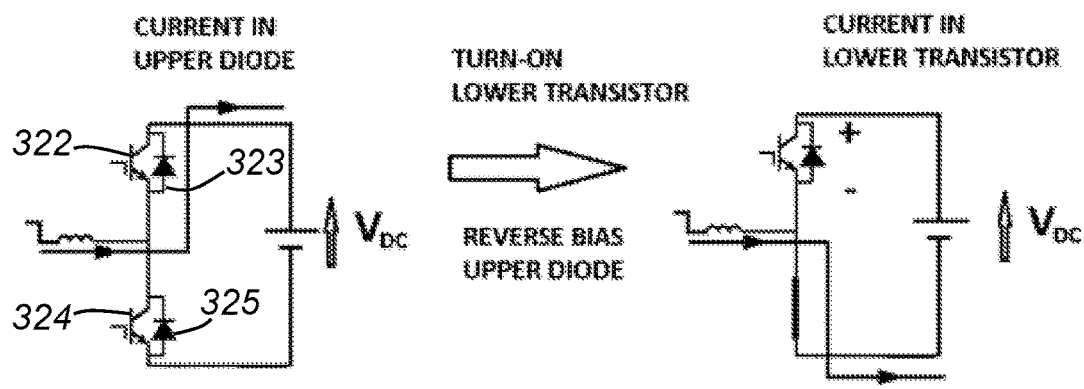
FIG. 3B illustrates how current is switched between the upper and lower branches of a phase leg of the converter to rectify AC to DC.

FIG. 3B shows, for one phase leg, the normal process of commutating from an upper diode 323 to a lower transistor 324. Initially current is flowing through the upper leg through the upper diode 323. By turning on the lower transistor 324 (as in the right-hand circuit), the DC side voltage is imposed across the conducting diode 323 in a reverse direction, which acts to turn off the diode 323 allowing conduction through the lower transistor. Thus, it can be seen that the DC side voltage is instrumental in commutating the diode 323 to its non-conducting state to permit commutation of the current to the lower branch.

FIG. 4

Figure 4:
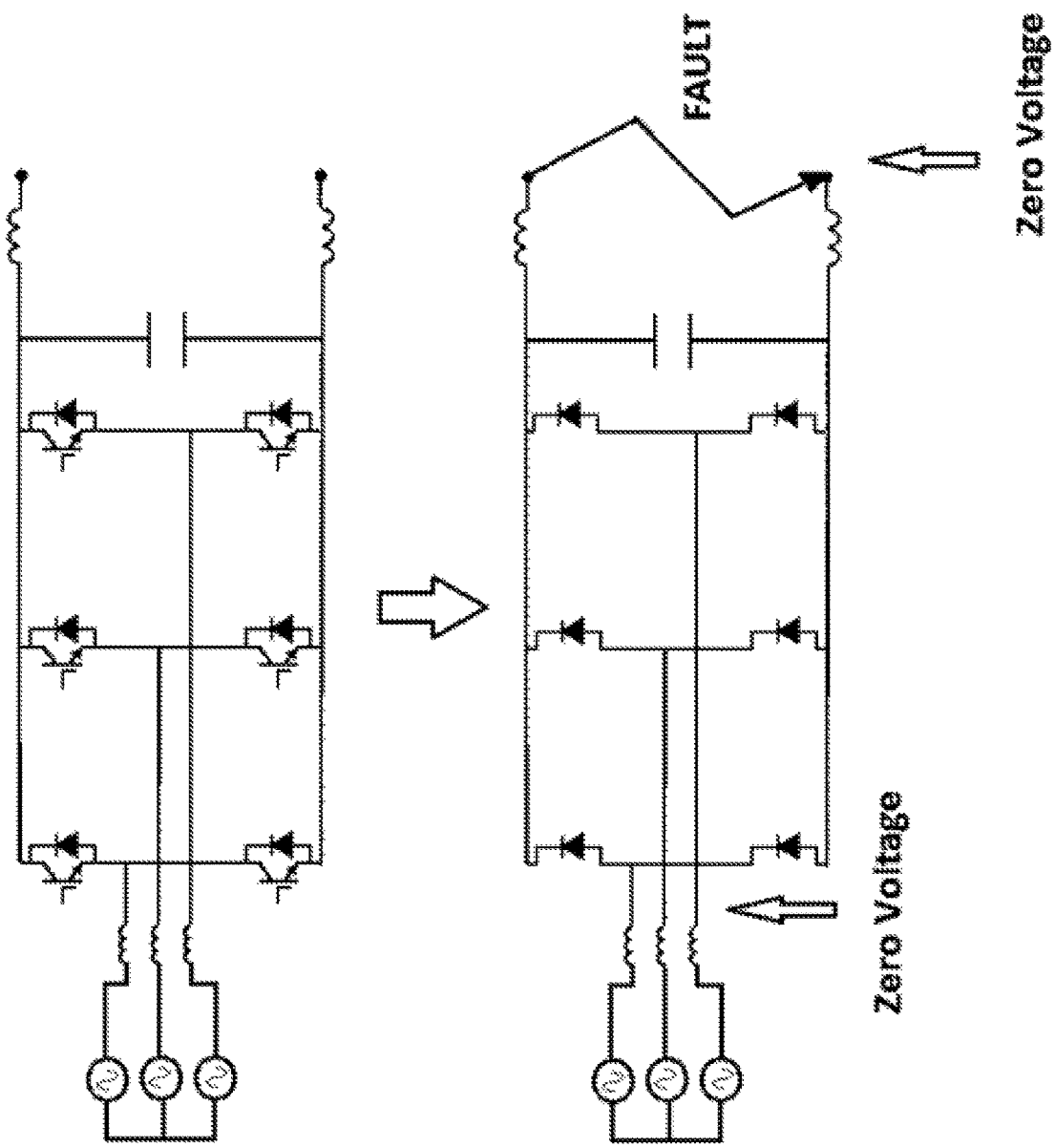
FIG. 4 illustrates the effect of a DC network fault on an AC-DC converter.

FIG. 4 illustrates the effect of a DC network fault (e.g., a fault in a load connected in the DC network which places a low impedance across the DC network terminals) on the operation of the electrical power system 300.

Following a fault in the DC network 330 the DC-side voltage collapses, possibly to zero Volts though in general the fault may have some resistance in which case the voltage may not collapse all the way to zero. The significance of this is that there is no voltage (or more generally only a small voltage) available to reverse bias the conducting diode (e.g., diode 323 in FIG. 3B) to turn it off. If the voltage is not large enough (and in general this cannot be guaranteed), the converter loses the ability to commutate current between the upper and lower branches of the phase legs 321a, 321b, 321c.

Another effect of the DC network fault is that the fault current supplied to the DC network 330 will be controlled almost exclusively by the voltage generated by the electrical machine 310 and the machine's impedance. The fault current supplied to the DC network 330 via the converter 320 will therefore typically be very large. For example, even for a 3-phase generator deliberately designed to have a high reactance to limit the output fault current of each phase to 500 $A_{RMS}$, the DC fault current contributed by 3-phases acting together would be approximately 707 A and would also contain a significant ripple component.

In view of the high fault current, it is common to switch off the active transistors in the event of a DC network fault, to protect them from over-current stress. This leaves the converter configuration illustrated in the lower circuit of FIG. 4: the converter 320 will operate as an uncontrolled diode rectifier. Briefly referring to FIG. 7, this illustrates the 3-phase generator current output by the generator 310 and also the waveform of the fault current supplied to the DC network 330 in the uncontrolled rectifier mode of operation.

In some systems the uncontrolled diode rectifier mode of operation is acceptable because the converter 320 is at least supplying current to the network 330. In other systems, however, in particular safety-critical aerospace systems, it would be highly desirable to have additional control over the level of current supplied to the DC network 330 following the fault.

FIGS. 5A-C

Figure 5A:
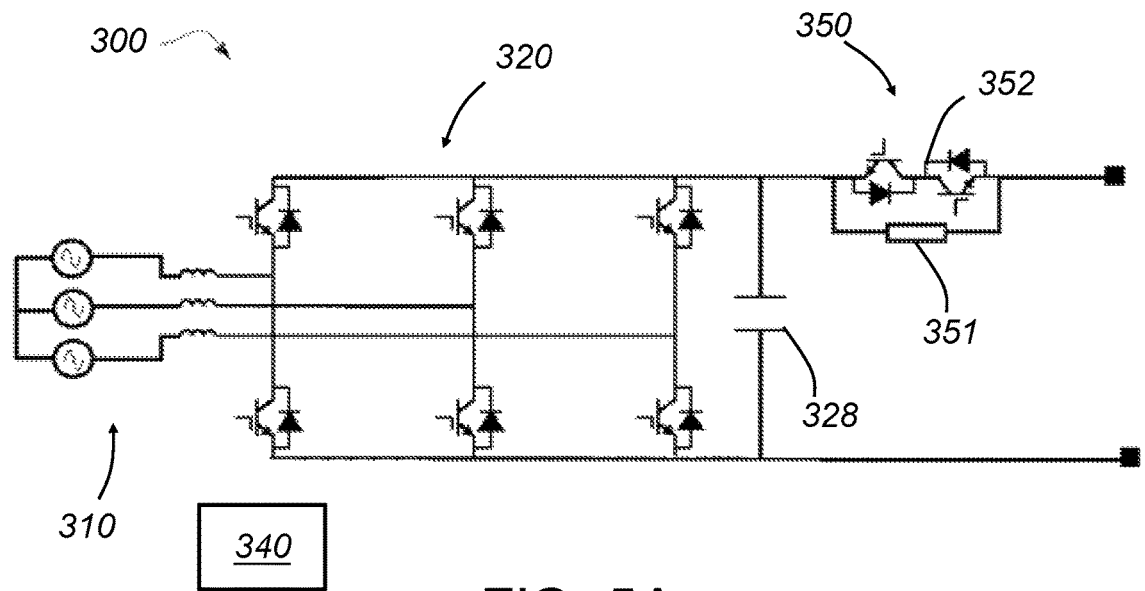
FIG. 5A illustrates the electrical power system of FIG. 3A incorporating a soft-start circuit.
Figure 5B:
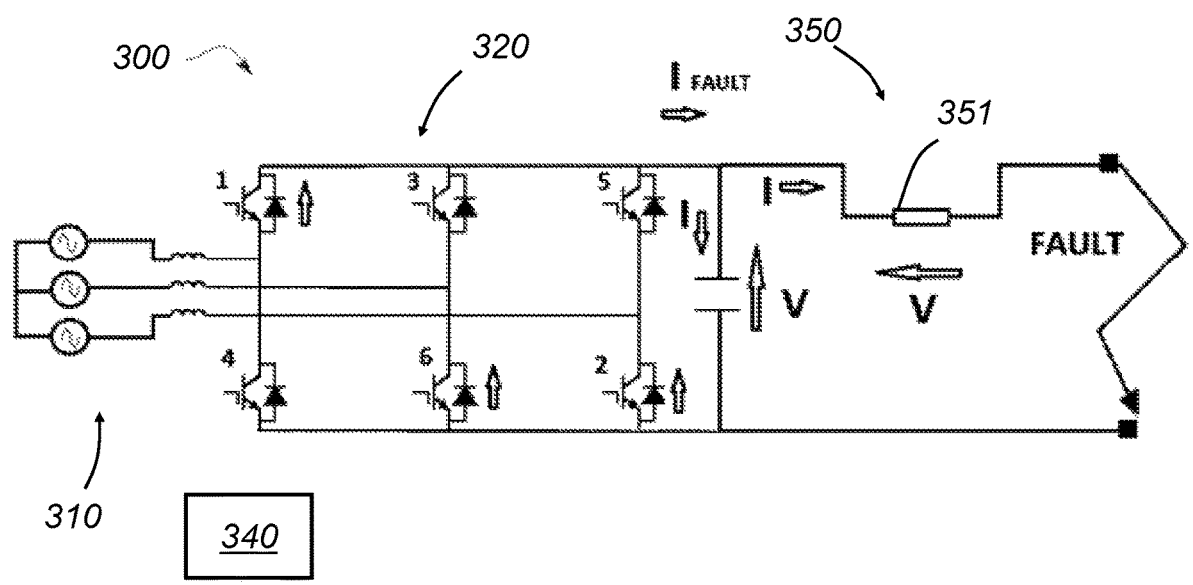
FIG. 5B illustrates how the soft-start circuit can inject a diode biasing voltage in the presence of a DC network fault.
Figure 5C:
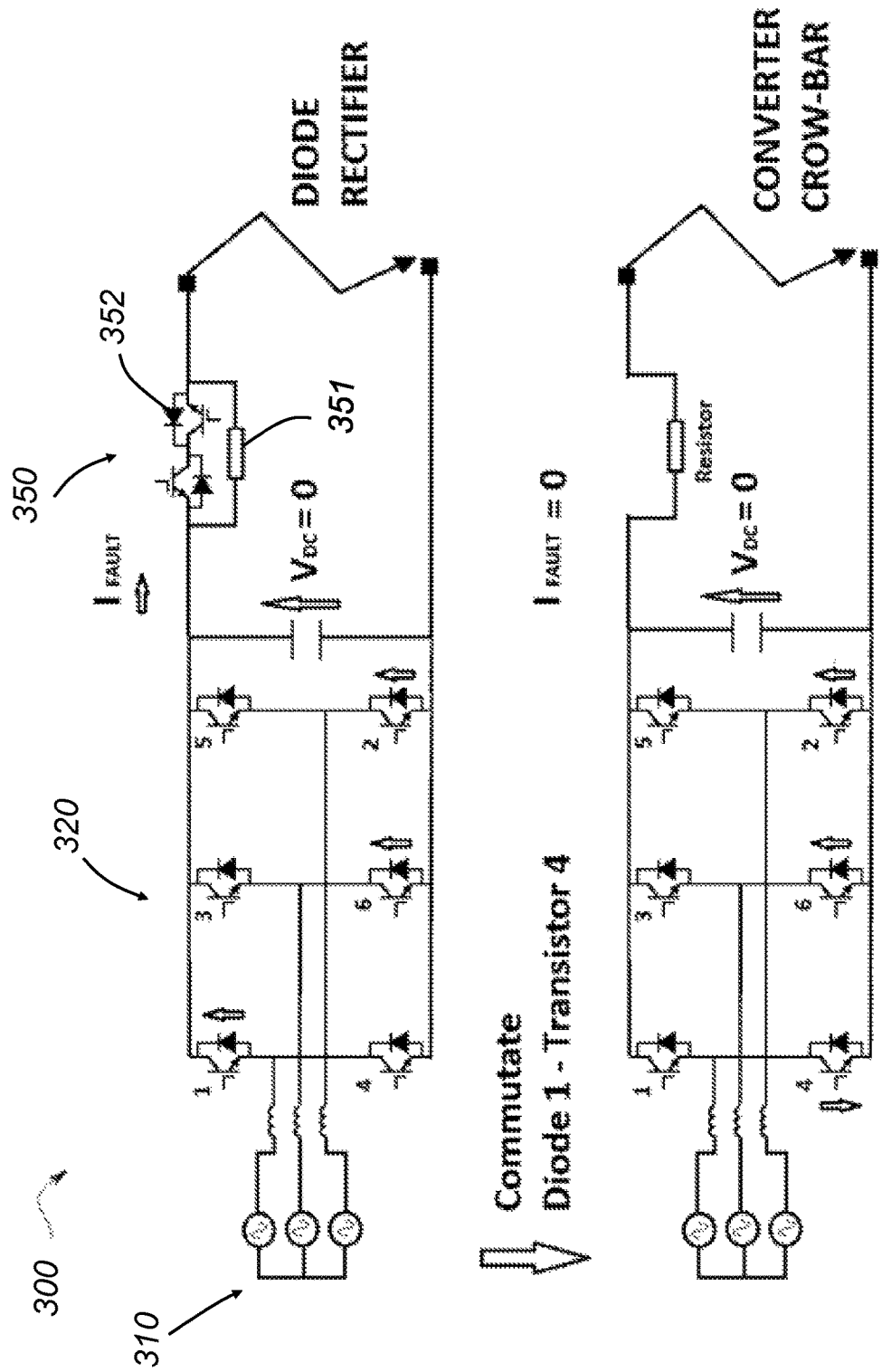
FIG. 5C illustrates the switching of the converter into a crow-bar configuration following a DC network fault.

In accordance with an embodiment of the invention, FIGS. 5A and 5B illustrate the use of a soft-start circuit 350 to inject a voltage to reverse bias the diodes of the converter 320 to allow control of the commutation of current despite a DC network fault. FIG. 5C illustrates the commutation of the converter 320 into a crow-bar configuration to reduce the fault current supplied to the DC network 330 following the fault.

In more detail, FIG. 5A illustrates the previously described electrical power system 300 but with a soft-start circuit 350 also shown connected on the DC-side of the converter 320. The soft-start circuit, which is well-known and widely used in electrical power systems, comprises a resistor 351 with a bypass switch 352 connected across its terminals. The bypass switch 352 can take any suitable form. In some embodiments the switch 352 comprises one or more semiconductor switching components, for example transistors or silicon controlled rectifiers (SCRs).

When the converter 320 is first energised, during which time the DC filter capacitor 328 is initially charged, the DC network 330 will tend to supply a large and damaging inrush current. The resistor 351 of the soft-start circuit 350 acts to limit this current to prevent damage. Once stable operation is reached (e.g., when the DC filter capacitor 328 is charged), the resistor 351 is shorted out by closing the bypass switch 352. This prevents the resistor 351 negatively affecting operation of the converter 320. (If not shorted out the resistor 351 would e.g., cause the DC output voltage to adversely change with load current and also create additional energy losses).

Ordinarily this is the extent of the operation of the soft-start circuit 350. However, in accordance with some embodiments described herein, the resistor 351 is reintroduced to the circuit (by controlling the opening the switch 352) in the event of a fault in the DC network 330. This is illustrated in FIG. 5B. Reintroducing the resistor 351 and its resistance to the fault current path decouples the DC filter capacitor 328 from the fault, directing a proportion of the fault current to flow into the capacitor 328 thus allowing it to develop a direct voltage, shown in FIG. 5B, capable of suitably biasing the converter diodes.

With the diode biasing DC-side voltage established, the converter 320 can commutate current between the branches of the phase legs 321a-c and thus remove current from the DC fault. This is illustrated in FIG. 5C. As shown in upper circuit of FIG. 5C, immediately following the fault the converter 320 enters the diode rectifier mode. In response, and as is shown the lower circuit, the controller 340 opens the bypass switch 352 to introduce the resistor 351 to the circuit to reverse bias the converter diodes. The controller 340 then controls the switching of the transistors to commutate the current so as to enter the crow-bar configuration. In the crow-bar configuration the current from the generator 310 cannot reach the DC network 320 and is instead contained within the generator 310 and converter 320.

It will be appreciated that FIG. 5C illustrates a crow-bar configuration in which current is conducted through the lower set of transistor-diode pairs (i.e., those labelled 4, 6 and 2) such that current is contained in the lower half of the converter bridge. Alternatively, a crow-bar configuration in which current is conducted through the upper set of transistor-diode pairs (i.e., those labelled 1, 3 and 5) could be used, or indeed the controller may switch the converter 320 between these two configurations.

It is generally undesirable for the resistor 351 of the soft-start circuit 345 to be connected within the DC fault path for prolonged periods, as the resistor 351 will dissipate a large amount of heat and may be damaged unless adequate heat sinking is provided. However, the injection of the resistor 351 for short periods to assist in the commutation of the converter 320 should generally be acceptable. In many cases the resistor 351 need only be switched into the circuit for long enough to affect a new system operating state, for example by opening or closing one or more circuit breakers (e.g., DC contactors) in the DC network to isolate the fault. Operating the circuit breakers at low or zero fault current is desirable as it may, for example, alleviate problems with contactor arcing.

In another embodiment of the invention, where the bypass switch 352 of the soft-start circuit 350 takes the form of a semiconductor switching component (e.g., a transistor) the injection of the voltage to bias the diodes of the converter 320 may be performed without the use of the resistor 351. Specifically, operating the semiconductor switching component 352 for short periods of time in its linear operating region, with a current level within its safe thermal limits, will develop a higher voltage to produce the diode commuting voltage.

Whilst the embodiments described above envisage the use of components of a soft-start circuit 350 to inject the biasing voltage, it should be appreciated that the resistor 351 and/or semiconductor switching component 352 used to inject the voltage may instead form part of another arrangement. For example, one or both components 351, 352 may be part of an auxiliary circuit dedicated to providing a biasing voltage following a DC network fault. Using the soft-start circuit 350 may be considered particularly convenient because it allows the biasing function to be achieved without the addition of system components, since many systems already include a soft-start circuit 350. However, the use of another (e.g., dedicated) circuit may allow for the selection of components with parameters specifically selected for the voltage injection function (e.g., a particular resistance value which balances the need to provide a high enough voltage but which does not generate excessive heat may be selected).

FIGS. 6A-C

Figure 6A:
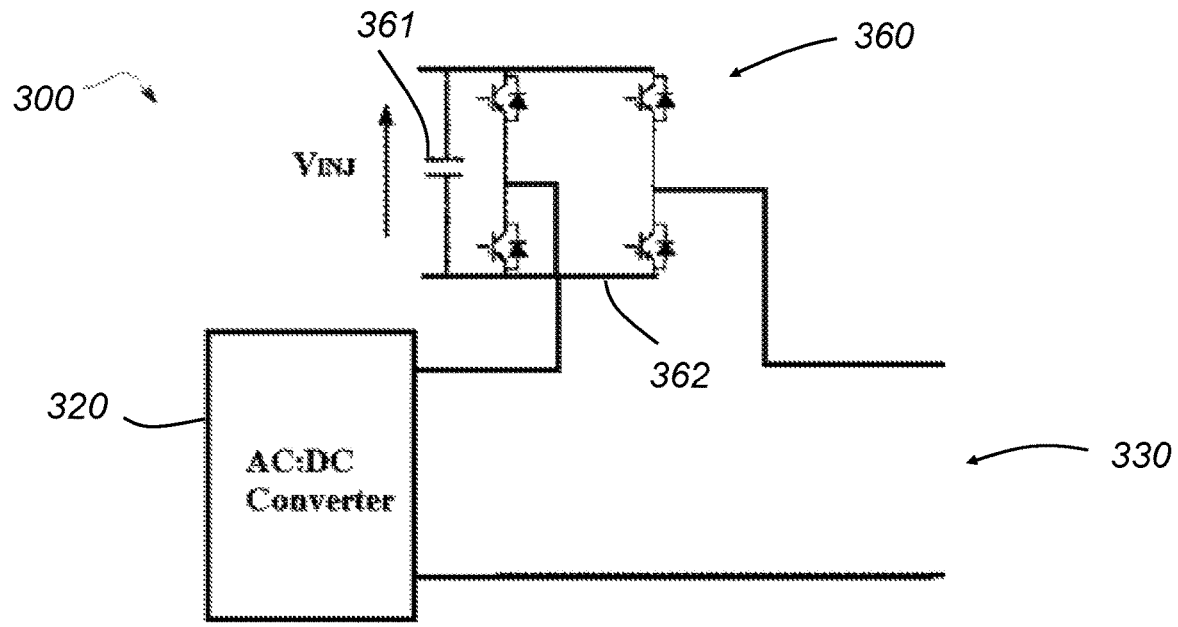
FIGS. 6A-C illustrate an arrangement in which a diode biasing voltage is injected by discharging a capacitor of a full-bridge circuit.
Figure 6B:
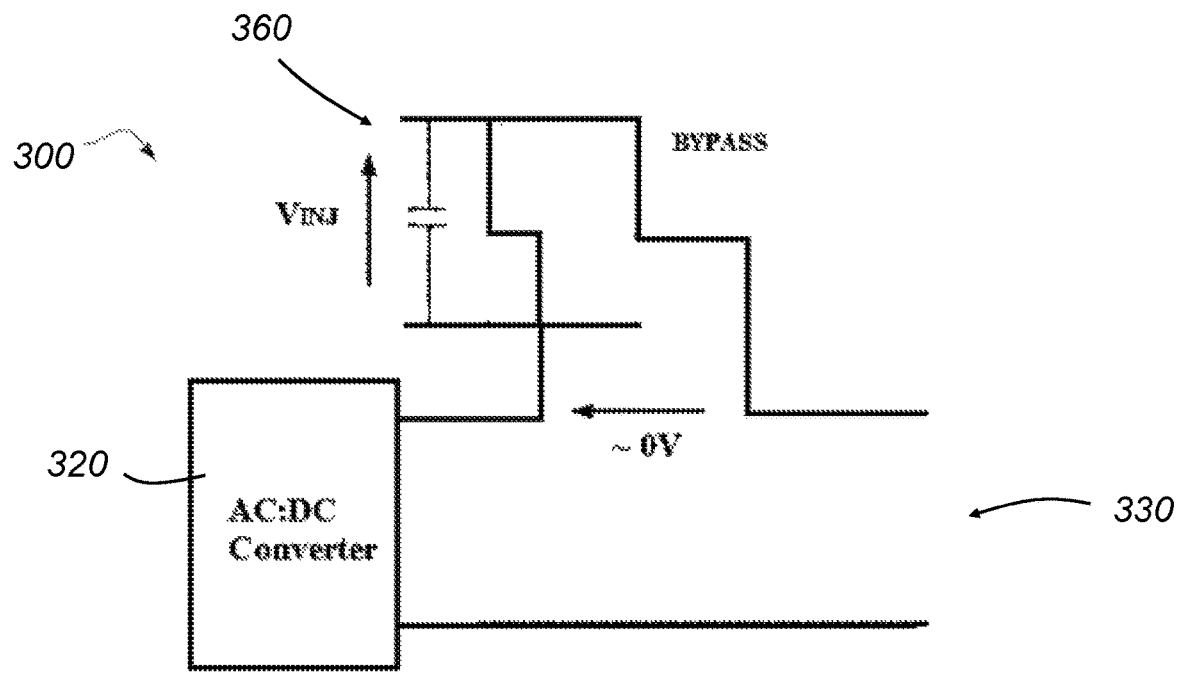
Figure 6C:
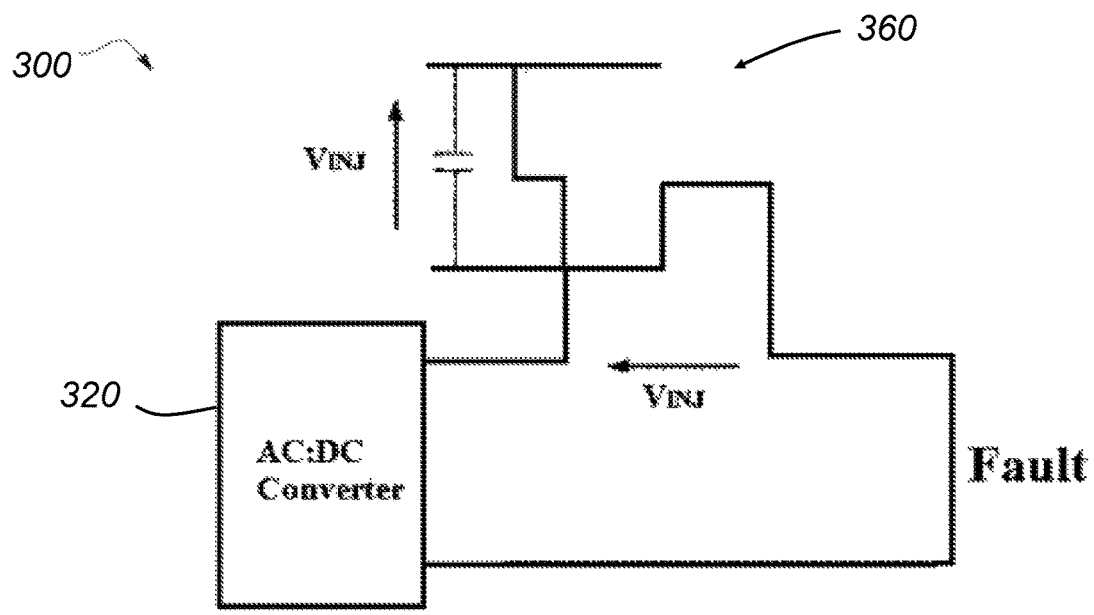

FIGS. 6A to 6C illustrate another embodiment of the invention by which a diode biasing voltage may be injected in response to a DC network fault. It is noted that FIGS. 6A-C are a simplified view of the system 300 and the electrical machine 310 is not shown.

In this embodiment an auxiliary voltage source 360 is connected between the DC side of the converter 320 and the DC network 330. The auxiliary voltage source 360 comprises a capacitor 361 connected across the terminals of a low voltage bridge 362 (a full-bridge or half-bridge structure may be used, for example) which includes a number of transistors. The transistors can be switched to either isolate or connect the capacitor 361 to the DC side of the converter 320.

FIG. 6B illustrates the normal (i.e., un-faulted) operation of the system 300. In this case the transistors of the low voltage bridge 362 are switched so as to apply a voltage to charge the capacitor 361 and to also provide a bypass path so that the capacitor is not connected with the DC network 330 and converter 320.

In response to a fault in the DC network 330, the controller 340 controls the switching of the transistors of the bridge 362 so as to connect the capacitor 361 between the DC side of the converter 320 and the DC network 330. This is shown in FIG. 6C. The inserted capacitor 361, which in this example is charged by the fault current to develop an increased voltage, provides the desired biasing voltage to the converter diodes.

It should be appreciated that voltage sources 350, 360 described with reference to FIGS. 5A-C and 6A-C are only examples and that other ways of providing the desired voltage will occur to those skilled in the art. Generally speaking, any suitable circuit arrangement comprising one or more resistors, capacitors, inductors or semiconductor components capable of being switched into and out of DC path may be used.

FIG. 7

Figure 7:
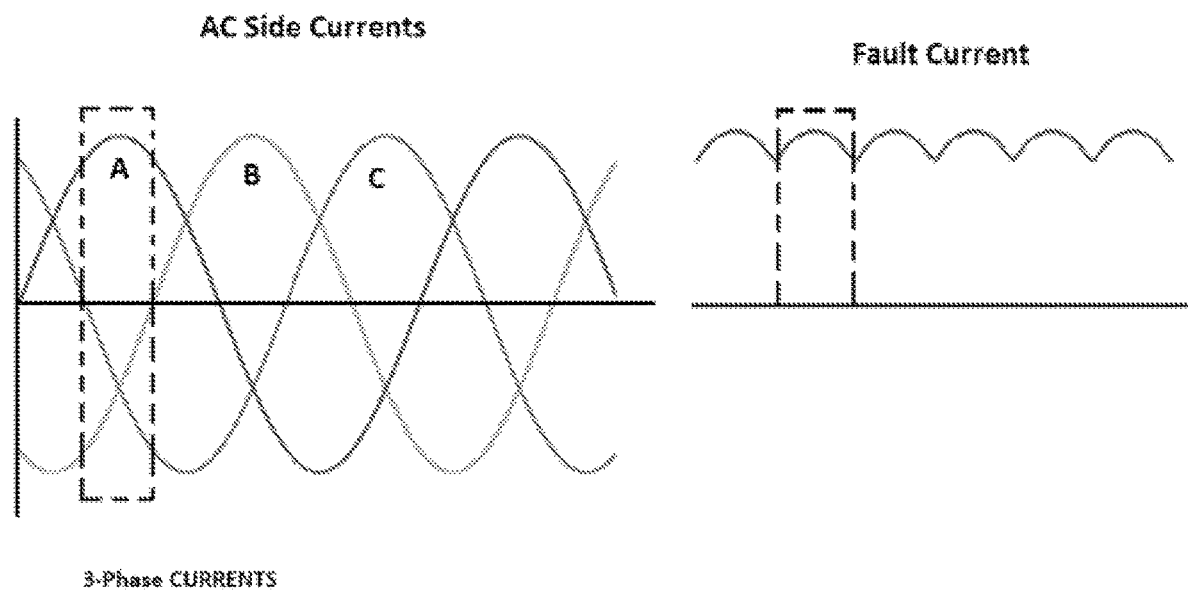
FIG. 7 illustrates the waveform of the fault current which will be supplied to the DC network following a fault in the uncontrolled diode rectifier mode.

The left-hand graph of FIG. 7 illustrates the 3-phase AC-side current produced by a 3-phase electrical generator 310. The three phases are sinusoidal and offset from each other by 120 degrees. One 60 degree interval of one of the three phases (phase A) is highlighted within the dashed box.

The right-hand graph of FIG. 7 illustrates the corresponding fault current delivered to the DC network 330 when the converter 320 operates as an uncontrolled diode rectifier, i.e., without utilising the invention described herein. The same 60 degree interval is highlighted in the right-hand graph.

FIG. 8

Figure 8:
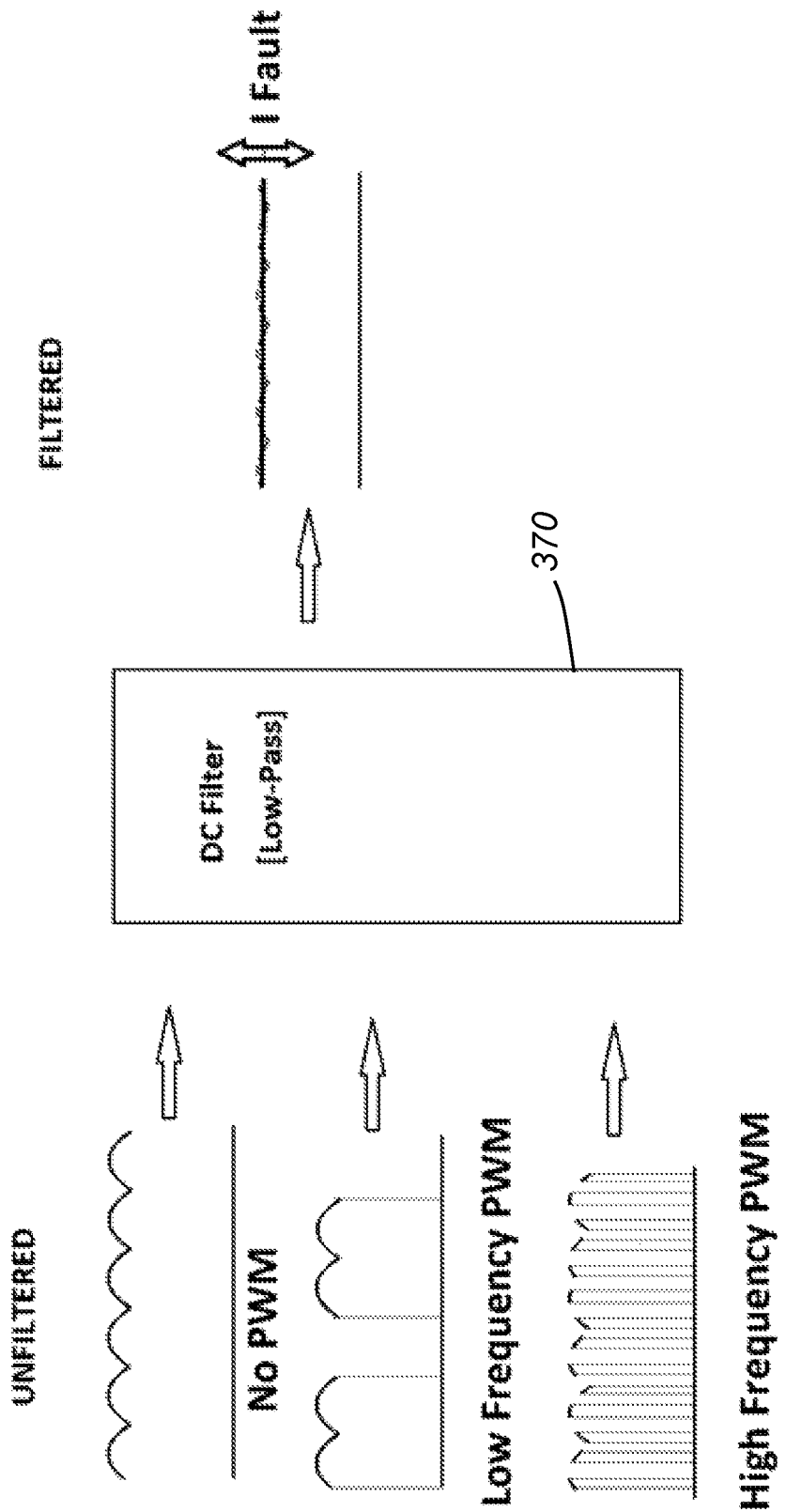
FIG. 8 illustrates how the waveform of the fault current can be modified using the crow-bar configuration, modulation of PWM control parameters and a filter.

FIG. 8 illustrates ways in which the current which is supplied to the faulted DC electrical network may be controlled. By way of reference the top-left waveform of FIG. 8 (labelled "No PWM") is the fault current waveform in the absence of any control (i.e., it corresponds to the right-hand graph of FIG. 7 in which the invention is not utilised).

According to one embodiment, following the injection of the diode biasing voltage, the transistors of the converter 320 are switched into the crow-bar configuration shown in FIG. 5C. This results in zero current being supplied to the DC network. Supplying zero current to the faulted DC network may be desirable in some instances, for example where circuit breaking components such as DC contactors are to be opened or closed to isolate faults.

In other embodiments, where it is instead preferable to supply some (i.e., not zero) current to the DC network, the controller 340 may repeatedly switch the converter transistors between the crow-bar configuration and a rectifier configuration in which the fault current is supplied to the DC network. In this way the time-averaged current supplied to the DC network will be less than full fault current level because the time spent in the crow-bar configuration will pull the average current down.

Where the latter approach is taken, the average current and the current waveform will depend on the modulation of the PWM signal used to switch the transistors. The greater the pulse width (equivalently, the greater the duty cycle), the higher the average current will be. The greater the frequency, the more chopped the waveform will be. The latter is illustrated in the second and third left-hand waveforms of FIG. 8 (labelled "low frequency PWM" and "high frequency PWM"). Thus, the PWM control parameters may be selected and varied according the desired current level and waveform.

Optionally, the current output by the converter 320 can be passed through an existing or dedicated filter 370 (e.g., a low-pass DC filter) to smooth the current waveform supplied to the DC network 330. In the presence of a fault the DC filter may be tuned according to the downstream requirements of the DC network. The unfiltered waveforms are illustrated on the left-hand side of FIG. 8, under the heading "Unfiltered". An exemplary filtered waveform is shown on the right-hand side under the heading "Filtered".

FIG. 9

Figure 9:
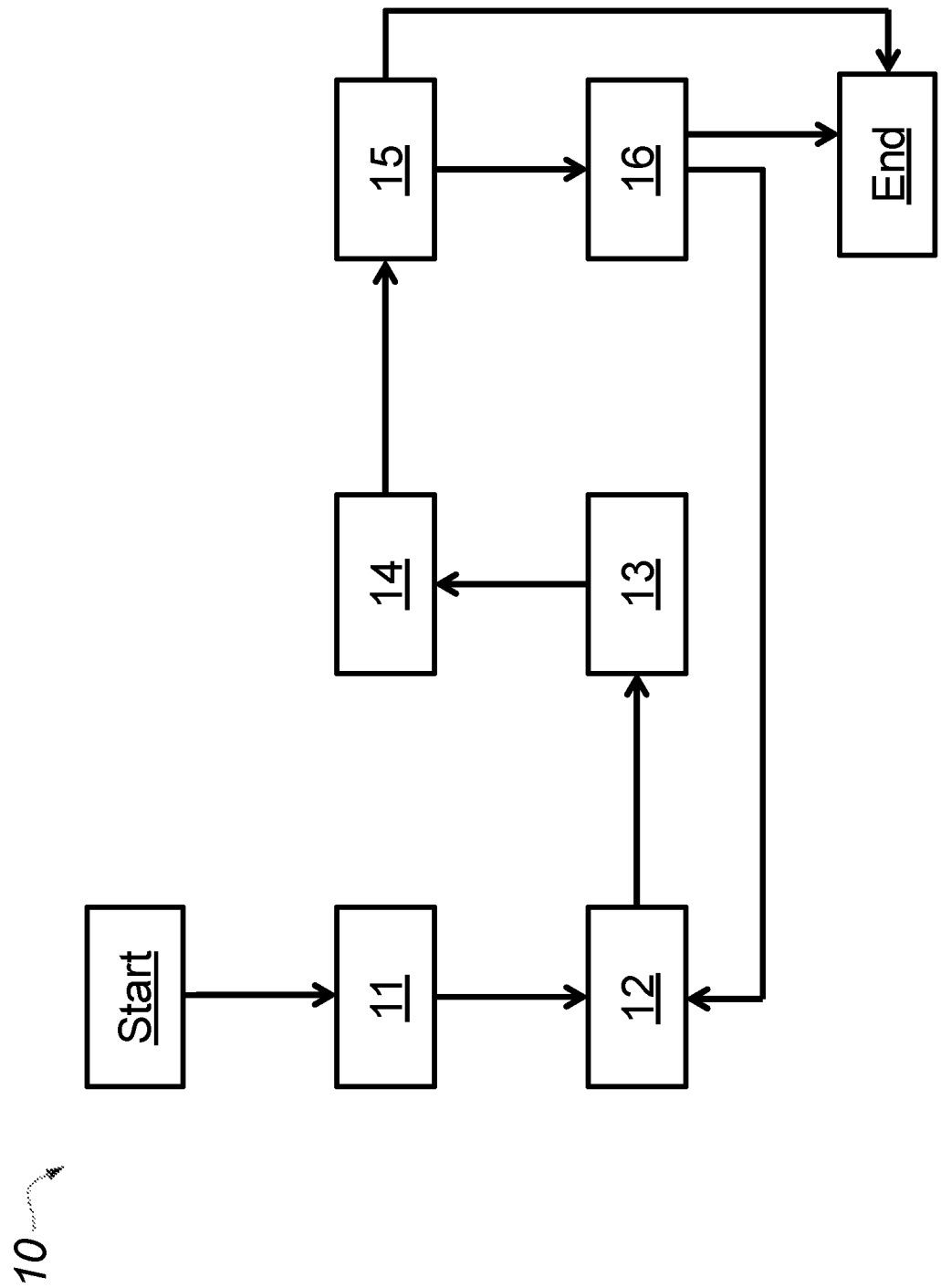
FIG. 9 is a flow chart illustrating a method of controlling an electrical power system.

FIG. 9 is a flow diagram illustrating a method 10 of controlling an electrical power system 300. The method 10 may be performed by a control system which is or includes the controller 340. The controller 340 may, for example, be an EEC 117 or one or more functional modules of an EEC 117.

At step 11 the electrical power system 300 is operating in a normal condition. The rotor of the electrical machine 310 is being driven to rotate by a shaft, for example a spool of a gas turbine engine, and the machine 310 is generating AC electrical power. The generated AC electrical power is output from the electrical machine to an AC to DC power electronics converter 320. Generally speaking the electrical machine 310 may be a variable speed machine driven to rotate at or at a speed related to the speed of the engine drive shaft, such that the frequency and voltage of the output AC varies.

At step 12, with the electrical power system 300 still operating in the normal condition, the AC to DC converter 320 rectifies the AC to DC and outputs the DC to supply the DC electrical network 330 with DC electrical power. In order to rectify the AC to DC, the controller 340 controls the switching of the transistors of the phase legs of the converter to commutate current and affect rectification. For example, the controller 340 may supply PWM signals to the transistors in an appropriate order and with appropriate switching frequency and duty cycle to supply the desired level of DC to the network 330.

At step 13, the controller 340 determines a condition to the effect that there is a fault in the DC electrical network 330. The determination of a fault may occur in any number of different ways, and the precise details are beyond the scope of the present disclosure. In one example, voltage and current levels are measured at the loads and at a various other positions about the network 330, and faults are recognised by the controller 340 based on changes in the measured current and/or voltage levels. Alternatively, fault detection may take place locally (e.g., at a controller local to a faulted load) and a fault report may then be communicated to the controller 340. Various other ways of determining faults are known and will occur to those skilled in the art.

At step 14, responsive to the determination in step 13, the controller 340 controls a voltage source 350, 360 to inject a voltage to bias the diodes of the converter 320. In particular, the fault in the DC network 330 will have caused the DC-side voltage to collapse, likely to a level below that required to reverse bias the converter diodes to allow commutation of the current between the branches of the converter phase legs. The controller 340 therefore controls a voltage source 350, 360 to inject a voltage sufficient to appropriately bias the diodes.

The voltage source 350, 360 can take any suitable form which allows an appropriate voltage to be controllably injected from the DC side of the converter 320. In some embodiments the voltage source takes the form of a dedicated auxiliary circuit 360 whose specific purpose is to selectively inject voltage from the DC side of the converter 320 in case of a fault. In other examples an existing circuit, for example a soft-start circuit 350, may be leveraged to inject the voltage so that further components are not required to support the function. Various examples of voltage sources have been described above with reference to FIGS. 5A-5C and 6A-6C.

At step 15, after controlling the voltage source 350, 360 to inject a voltage to reverse bias the diodes in step 14, the controller 340 controls switching of the transistors of the converter 320 to control a level of current supplied to the DC electrical network. In particular, with the ability to commutate the current restored, the controller 340 can control the converter 320 to reduce the level of current supplied to the DC network 330 to a level below the full fault current which would otherwise be supplied.

In some embodiments the controller 340 may control the converter 320 to reduce the current level to zero, by switching to and remaining in the crow-bar configuration. In other embodiments the controller 340 may control the converter to reduce the current level to a level between zero and the full fault current, by switching between the crow-bar configuration and the rectifier configuration. In this case the current level and waveform can be controlled by controlling PWM control parameters, for example the frequency and duty cycle of the PWM signals. The DC output may also be passed through a filter to smooth the waveform to better approximate a true DC signal.

It should be appreciated that if bidirectional MOSFETs are used in place of IGBTs, the diode rectifier mode illustrated in FIG. 5C may be replaced by a so-called 'synchronous rectification mode' which makes use of the bi-directional current carrying capability of the MOSFETs. In the synchronous rectification mode, the diodes (whether separate diodes or the inherent body diodes of the MOSFETs) do not carry current. Instead, the bi-directional MOSFETs carry current in their reverse directions in place of the diodes. For instance, referring to FIG. 3A, current of phase C flowing through the upper branch of the third phase leg 321c to the first DC output 326 would flow through the transistor 322 in its reverse direction, and would not flow through the diode 323 as it would in the diode rectifier mode. Current of phase C flowing through the lower branch of the third phase leg 321c to the second DC output 327 would flow through the transistor 324 as in the diode rectifier mode. Those skilled in the art will appreciate the synchronous rectification mode may also be used prior to the fault, during step 12.

Optionally, at step 16, after controlling the current level at step 15, the controller 340 controls the state of one or more circuit breaking components (e.g., contactors) in the DC network 330. For example, the controller 340 may open a DC contactor to isolate a fault from the remainder of the DC network 330. If it is possible to completely isolate the fault, it may be possible to return to the normal operating condition of the system, with full and normal control of the AC to DC converter 320. In other cases the system 300 may remain in the condition of step 15 in which the current level is controlled but a fault still remains. In some instances, having safely controlled the current level in the DC network and taken appropriate action, the generator 310 may be disconnected from the drive shaft or may be isolated from the remainder of the electrical power system 300.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It should also be noted that whilst the embodiments have been described with reference to an aircraft, and to turbofan engines, it will be understood that the principles of the described electrical systems may be applied to other installations, for example to aircraft with turboprop engines, aircraft with purely electric power and propulsion systems, to marine environments such as on a naval vessel powered by gas turbines, a hybrid system or purely electric system, and to other transport applications including trains.

The invention claimed is:

1. An electrical power system comprising:
an electrical machine operable to output AC;
a DC electrical network;
a power electronics converter connected between the AC output of the electrical machine and the DC electrical network and comprising a plurality of transistors and associated diodes connected in parallel with the transistors; and
a controller configured to control switching of the transistors of the converter so that, during normal operation of the electrical power system, the converter rectifies the AC output of the electrical machine to supply the DC electrical network with DC electrical power, wherein:
the controller is further configured, responsive to a determination to the effect there is a fault in the DC electrical network, to control a voltage source to inject a voltage to bias the diodes of the converter, and to control the switching of the transistors to control a level of current supplied to the faulted DC electrical network, and
the voltage source comprises a resistor and a switch, and the switch (i) is closed to short the resistor during a normal operation of the DC electrical network so that current flows from the converter to the DC electrical network and (ii) is opened in response to the faulted DC electrical network so that current does not flow to the DC electrical network and is instead contained within the converter and the electrical machine operable to output the AC.

2. The electrical power system of claim 1, in which the voltage source further comprises one or more of the following connectable with the power electronics converter and the DC electrical network:
a capacitor; and/or
an inductor,
wherein the switch in the voltage source is a semiconductor switching component.

3. The electrical power system of claim 1, wherein controlling the voltage source to inject the voltage to bias the diodes comprises actuating a semiconductor switching component, which is the switch, to connect the resistor to the DC electrical network.

4. The electrical power system of claim 1, in which the switch is a semiconductor switching component, and wherein controlling the voltage source to inject the voltage to bias the diodes comprises operating the semiconductor switching component in a linear operating region to produce the voltage to bias the diodes.

5. The electrical power system of claim 1, comprising a soft-start circuit, and wherein the soft-start circuit comprises the voltage source.

6. The electrical power system of claim 1, wherein controlling the switching of the transistors to control the level of current supplied from the electrical machine to the faulted DC electrical network comprises:
switching the transistors of the converter to a crow-bar configuration in which current from the electrical machine does not flow to the DC network.

7. The electrical power system of claim 6, wherein controlling the switching of the transistors to control the level of current supplied from the electrical machine to the faulted DC electrical network further comprises:
repeatedly switching the transistors between the crow-bar configuration and a rectifier configuration in which current from the electrical machine does flow to the DC network.

8. The electrical power system of claim 1, wherein controlling the switching of the transistors to control the level of current supplied from the electrical machine to the faulted DC electrical network comprises:
modulating a pulse width modulation control parameter to control the level of current supplied from the electrical machine to the faulted DC electrical network.

9. The electrical power system of claim 1, further comprising a filter for smoothing a waveform of the current supplied to the faulted DC electrical network.

10. The electrical power system of claim 1, wherein the controller is further configured, responsive to the determination to the effect there is a fault in the DC electrical network, open one more circuit breakers or contactors in the DC electrical network.

11. The electrical power system of claim 1, in which:
the transistors are IGBTs or MOSFETs and the diodes are separate from the transistors; or
the transistors are MOSFETs and the diodes are body diodes of the MOSFETs.

12. The electrical power system of claim 1, wherein:
the electrical machine has a plurality of phases;
the power electronics converter comprises a phase leg for each one of the plurality of phases of the electrical machine, each phase leg comprising a first branch including a first transistor and an associated parallel first diode connected between a phase connection of the electrical machine and a first DC output of the converter, and a second branch including a second transistor and an associated parallel second diode connected between the phase connection of the electrical machine and a second DC output of the converter, the plurality of transistors including the first and second transistors, and the associated diodes including the first and second diodes; and
the first and second DC outputs of the converter are connected with the DC electrical network.

13. An aircraft power and propulsion system comprising:
a gas turbine engine; and
an electrical power system according to claim 1, wherein the electrical machine of the electrical power system is mechanically coupled with a spool of the gas turbine engine.

14. An aircraft comprising the power and propulsion system of claim 13.

15. A method of controlling an electrical power system comprising an electrical machine, a DC electrical network and a power electronics converter connected between the electrical machine and the DC electrical network, the method comprising:
generating AC using the electrical machine and supplying the AC to an input of the converter;
controlling switching of transistors of the converter to rectify the AC input to a DC output and supply the DC output to the DC electrical network;
determining a condition to the effect that there is a fault in the DC electrical network;
responsive to the determination, controlling a voltage source to inject a voltage to bias diodes of the converter; and
after controlling the voltage source to inject a voltage to bias diodes of the converter, controlling switching of the transistors of the converter to control a level of current supplied to the DC electrical network,
wherein controlling switching of the transistors of the converter to control the level of current supplied to the DC electrical network comprises modulating a pulse width modulation control parameter to control the level of current supplied from the electrical machine to the faulted DC electrical network, and
wherein the voltage source comprises a resistor and a switch, the switch is a semiconductor switching component, and controlling the voltage source to inject the voltage to bias the diodes of the converter comprises operating the semiconductor switching component in a linear operating region to produce the voltage to bias the diodes.

16. The method of claim 15, wherein controlling switching of the transistors of the converter to control the level of current supplied to the DC electrical network comprises:
switching the transistors of the converter to a crow-bar configuration in which current from the electrical machine does not flow to the DC network.

17. The method of claim 16, wherein controlling switching of the transistors of the converter to control the level of current supplied to the DC electrical network comprises:
repeatedly switching the transistors between the crow-bar configuration and a rectifier configuration in which current from the electrical machine does flow to the DC network.

18. The method of claim 15, further comprising, after controlling switching of the transistors of the converter to control the level of current supplied to the DC electrical network:
opening one more circuit breakers or contactors in the DC electrical network to isolate the fault in the DC electrical network.

19. A controller for an electrical power system configured to:
during normal operation of the electrical power system, control switching of a plurality of transistors of a power electronics converter to rectify AC received by the converter from an electrical machine; and
responsive to a determination to the effect there is a fault in a DC electrical network connected to a DC side of the converter, control a voltage source to inject a voltage to bias diodes of the converter, and control the switching of the transistors to control a level of current supplied to the faulted DC electrical network,
wherein controlling the switching of the transistors to control the level of current supplied to the faulted DC electrical network comprises modulating a pulse width modulation control parameter to control the level of current supplied from the electrical machine to the faulted DC electrical network, and
wherein the voltage source comprises a resistor and a switch, the switch is a semiconductor switching component, and controlling the voltage source to inject the voltage to bias the diodes of the converter comprises operating the semiconductor switching component in a linear operating region to produce the voltage to bias the diodes.

* * * * *